US00RE44273E

(19) United States
(12) Reissued Patent
Kline

(10) Patent Number: US RE44,273 E
(45) Date of Reissued Patent: Jun. 11, 2013

(54) THERMOSTATIC CONTROL VALVE WITH FLUID MIXING AND NON-LINEAR RESPONSE CHARACTERISTICS

(75) Inventor: Kevin B. Kline, Whitefish Bay, WI (US)

(73) Assignee: Magarl, LLC, Indianapolis, IN (US)

(21) Appl. No.: 13/169,738

(22) Filed: Jun. 27, 2011

Related U.S. Patent Documents

Reissue of:
(64) Patent No.: 5,323,960
Issued: Jun. 28, 1994
Appl. No.: 08/020,622
Filed: Feb. 22, 1993

(51) Int. Cl.
*G05D 23/13* (2006.01)

(52) U.S. Cl.
USPC ..... 236/12.2; 236/DIG. 7; 374/203

(58) Field of Classification Search
USPC ... 236/12.1, 12.2, 18, 99 E, DIG. 7; 366/336, 366/340; 138/42, 44; 137/896, 897; 374/201–204
See application file for complete search history.

(56) References Cited

U.S. PATENT DOCUMENTS 1,915,867 A * 6/1933 Penick ..... 138/42
RE19,488 E * 3/1935 Russell et al. ..... 236/12.2
2,125,245 A * 7/1938 McCray ..... 138/42
2,203,130 A * 6/1940 Costello ..... 366/340
2,211,672 A * 8/1940 Reeder ..... 236/91 R
2,855,151 A * 10/1958 Lesovsky ..... 236/12.14
3,361,412 A * 1/1968 Cole, III ..... 366/268
3,593,964 A * 7/1971 Morane ..... 366/340
4,514,095 A * 4/1985 Ehrfeld et al. ..... 366/340
5,203,496 A * 4/1993 Kline ..... 236/12.2

* cited by examiner

*Primary Examiner* — Marc Norman
(74) *Attorney, Agent, or Firm* — Woodard, Emhardt, Moriarty, McNett & Henry LLP

(57) ABSTRACT

A thermostatic control valve assembly for use in continuously mixing a hot first fluid with a cold second fluid to continuously produce a mixed fluid at a constant temperature. The valve assembly includes an improved baffled mixing dome defining a mixing chamber that facilitates thorough mixing of the hot and cold fluids over a wide range of flow rates. Also included is an improved multiple response thermostat having a fast response rate adjacent to the entrance of the mixing dome for responding quickly to the temperature of fluid entering the mixing dome. The valve assembly further includes a piston/cylinder configuration which covers and uncovers internal passageways to control the mixed fluid temperature. The internal passageways are shaped to cause a non-linear change in the mixed fluid temperature in the mixing dome as the piston moves in the cylinder.

16 Claims, 6 Drawing Sheets

THERMOSTATIC CONTROL VALVE WITH FLUID MIXING AND NON-LINEAR RESPONSE CHARACTERISTICS

Matter enclosed in heavy brackets [ ] appears in the original patent but forms no part of this reissue specification; matter printed in italics indicates the additions made by reissue.

[REFERENCE TO RELATED APPLICATIONS]

[This application is a continuation-in-part application of my co-pending patent application Ser. No. 07/664,356 filed Mar. 4, 1991, now U.S. Pat. No. 5,203,496.]

BACKGROUND OF THE INVENTION

The present invention relates to the field of fluid mixing valve assemblies. More particularly, the invention concerns thermostatically controlled mixing valve assemblies in which a thermostat is immersed in the fluid flowing through the valve.

Thermostatic control valve assemblies are well known in the art and have long been utilized in various applications including group showers, washing stations, hospital hydrotherapy installations and in many industrial applications where precision thermostatic water blending is essential. In order to operate properly, the hot and cold water entering such a valve assembly must be thoroughly blended before the temperature of the mixture is sensed by the thermostat. If the hot and cold water are not adequately mixed, the valve assembly can behave erratically because the temperature sensor sees pockets of hot and cold water instead of a mixture that is at a single temperature throughout. One problem that has long persisted in the art is the inability of most valve assemblies to adequately mix the hot and cold water over a wide range of flow rates. Consequently, multiple valves often have to be used to satisfy flow requirements.

Another problem that has persisted in the art is the physical size of the valve assembly required for a specific application. Often, the valve assembly is simply too large because of the need for a large mixing chamber to adequately mix the hot and cold water. What is needed is a thermostatic control valve assembly having an improved mixing chamber that has the ability to thoroughly mix the hot and cold water over a wide range of flow rates, and which does so in a smaller physical space than valve assemblies currently known in the art.

Still another problem of previously known thermostatic mixing valves is the performance of the mixing valve at low flow conditions. Because inadequate mixing occurs at low flow conditions, the performance of the valve becomes erratic due to the resulting temperature fluctuations. Locating the thermostat further downstream of the valve inlets and mixing ports improves mixing to reduce the erratic tendencies of the valve. However, because the fluid must travel further to reach the thermostat, the response time of the valve increases. Therefore, an improved thermostatic mixing valve is needed which promotes mixing at low flow conditions to reduce erratic tendencies of the valve while still responding quickly to fluid temperature changes.

SUMMARY OF THE INVENTION

A thermostatic control valve assembly for mixing a hot fluid and a cold fluid for discharge at a controlled temperature according to one embodiment of the present invention includes a valve housing having a fluid outlet and separate hot and cold fluid inlets and having a mixing chamber in fluid communication with the outlet. Flow control valve means is fluidly coupled with the hot and cold fluid inlets and the mixing chamber for controllably mixing hot and cold fluid received through the hot fluid inlet and the cold fluid inlet, respectively, and supplying the mixed fluid to the mixing chamber. A multiple response thermostat is disposed within the mixing chamber between the outlet and the flow control valve means. The multiple response thermostat includes a first thermostat portion having a first response rate and a second thermostat portion having a second faster response rate. The first thermostat portion is connected in series with the second thermostat portion, and the second thermostat portion is operably connected to the flow control valve means.

In another embodiment of the present invention, a valve assembly for mixing a hot fluid and a cold fluid for discharge at a controlled temperature includes a valve housing having a fluid outlet and separate hot and cold fluid inlets. A cylinder extends longitudinally through the valve housing and defines a cylindrical bore in fluid communication with the outlet. A piston is movably disposed in the cylindrical bore. First and second fluid passageways fluidly couple the hot and cold fluid inlets, respectively, to the cylindrical bore. A first fluid orifice is disposed in either the piston or the cylinder between the first fluid passageway and the cylindrical bore, and a second fluid orifice is disposed in either the piston or the cylinder between the second fluid passageway and the cylindrical bore. One of the first or second fluid orifices has a shape such that the fluid flow rate through the one of the first or second fluid orifices varies non-linearly with respect to the fluid flow rate through the other of the first or second fluid orifices as the piston moves in the cylindrical bore, thereby causing a corresponding non-linear change in the mixed fluid temperature in the cylindrical bore.

A general object of the present invention is to provide an improved thermostatic control valve assembly.

Another more specific object is to provide a valve assembly that more efficiently mixes hot and cold fluids for sensing the temperature of the mixture.

Yet another object of the present invention is to provide a thermostatic control valve assembly which quickly responds to changes in fluid temperature at low flow conditions.

Still another object of the present invention is to provide a valve assembly having non-linear response characteristics to provide varying degrees of sensitivity.

Related objects and advantages of the present invention will be apparent from the following description.

DESCRIPTION OF THE PREFERRED EMBODIMENT

Figure 1:
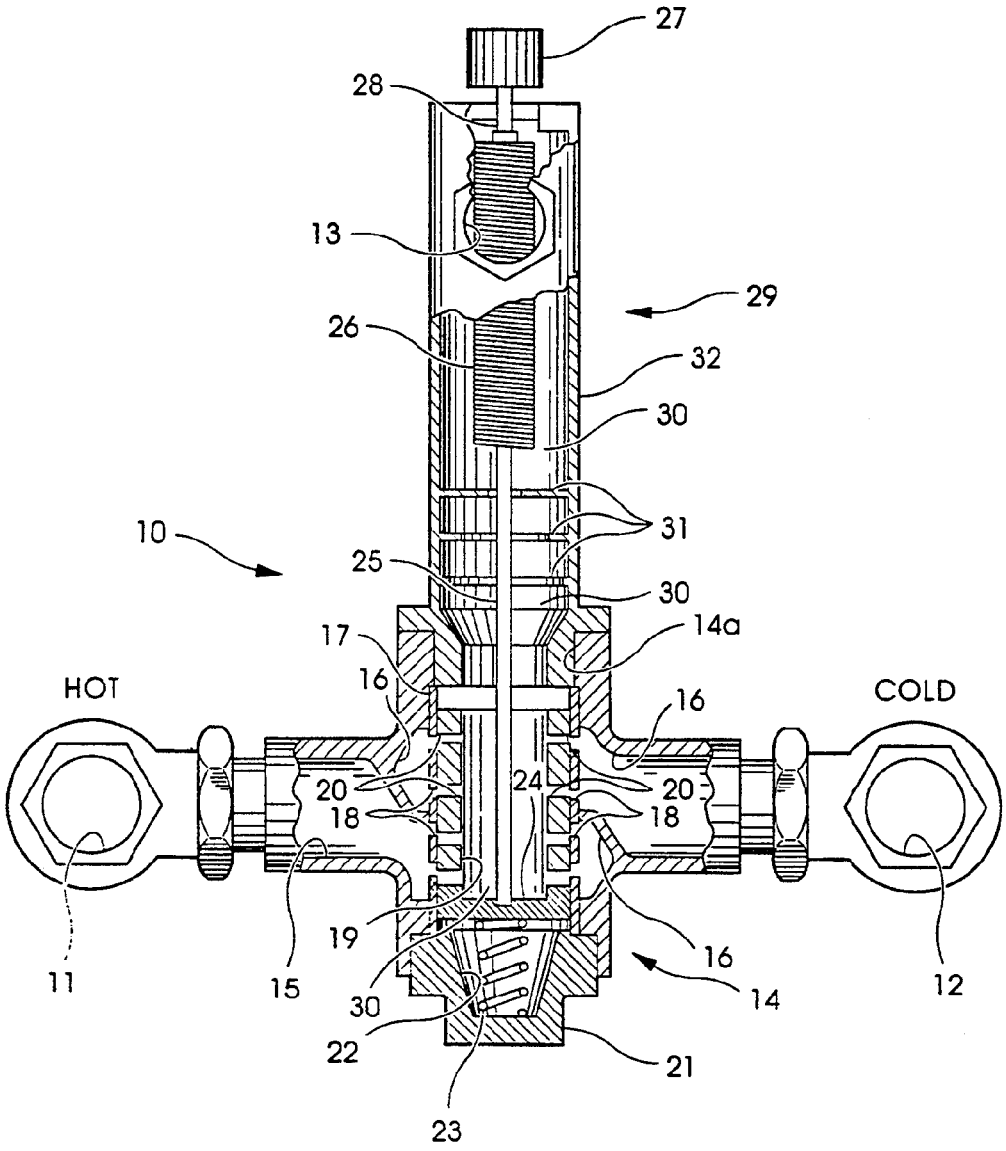
FIG. 1 shows a side cross-sectional view of a thermostatic control valve assembly according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, there is shown a thermostatic control valve assembly 10 with fluid mixing according to the preferred embodiment of the present invention. Valve assembly 10 includes a hot inlet 11, a cold inlet 12 and an outlet 13. Inlets 11 and 12 are connected to opposite sides of flow control valve 14 and open to annular cavities 15 and 16, respectively, within the flow control valve. The inner wall of annular cavities 15 and 16 is defined by a cylindrically shaped liner 17. Liner 17 is open at both ends and includes a plurality of openings or slots 18 which are distributed around its circumference in communication with cavities 15 and 16.

Slideably mounted within liner 17 is a cylindrically shaped piston 19 which is open at its upper end. Piston 19 is preferably pressure balanced and includes a plurality of openings or slots 20 that are distributed around its circumference. Preferably, each opening 20 through piston 19 has a counterpart opening 18 in liner 17. Modulation of the piston 19 within the liner 17 variably opens the cavities 15 and 16 to the interior of the piston 19, which communicates the combined hot and cold fluid to the outlet 14a of the flow control valve.

Flow control valve 14 also includes a bottom plug 21 which can be removed to allow access to repair, replace or clean the interior parts of flow control valve 14. Bottom plug 21 defines a cavity 22 therein which substantially receives compressed valve spring 23. Valve spring 23 is supported at one end by bottom plug 21 and is connected at its other end to the base 24 of piston 19. The spring 23 applies a return force to piston 19.

Also connected to base 24 is push rod 25. The opposite end of push rod 25 is connected to a thermostat 26. Thermostat 26 can be of many types known in the art, such as a thermal coil or a temperature sensitive bellows. Such a thermostat is designed to expand or contract along the axis defined by push rod 25 in linear proportion to a change in the temperature of fluid surrounding the thermostat. In this embodiment, thermostat 26 is connected to adjustment screw 27 via shaft 28. Adjustment screw 27 acts against spring 23 and thus allows the vertical position of the thermostat 26 and ultimately of the piston 19 to be adjusted, which in turn alters the relative proportions of hot and cold fluid passing through openings 20.

A mixing dome 29 is engaged over the outlet 14a of the flow control valve 14. The mixing dome 29 defines a mixing chamber 30 therein which is preferably cylindrical in configuration. An important feature of the present invention is the inclusion in the mixing dome 29 of means for turning the fluid flow through the mixing chamber 30 to ensure complete mixing of the hot and cold fluid exiting the flow control valve 14. Complete fluid mixing assures a uniform temperature throughout the fluid discharged through outlet 13. According to the invention, the means for turning the fluid includes a plurality of baffles 31 that are integrally formed as part of housing 32.

The shape and relative arrangement of baffles 31 are intended to induce more thorough blending of the hot and cold fluids in mixing chamber 30 before the mixture contacts thermostat 26, particularly at low flow rates. One problem that has persisted in the art is the inability of valve assemblies to operate properly over a wide range of flow rates. In other words, a flow control valve assembly is only useful over the range of flow rates that the device is able to thoroughly blend the hot and cold fluids before the mixture contacts the thermostat. While many known mixing valve assemblies are capable of adequate fluid mixing at high flows, a need remains for a valve assembly that is also capable of thorough hot and cold fluid mixing at low flow rates, such as below 10 g.p.m.

In order to reliably react to a change in the temperature of the fluid mixture, the thermostat must be immersed in the mixture, and the mixture must have a substantially uniform temperature throughout rather than consisting merely of hot and cold pockets. The problem of inadequate mixing occurs primarily at low flow rates. Baffles 31 of the present invention tend to induce turbulence into the flow that results in a substantially uniform fluid mixture and temperature prior to flowing around the fluid-immersed thermostat.

Figure 2:
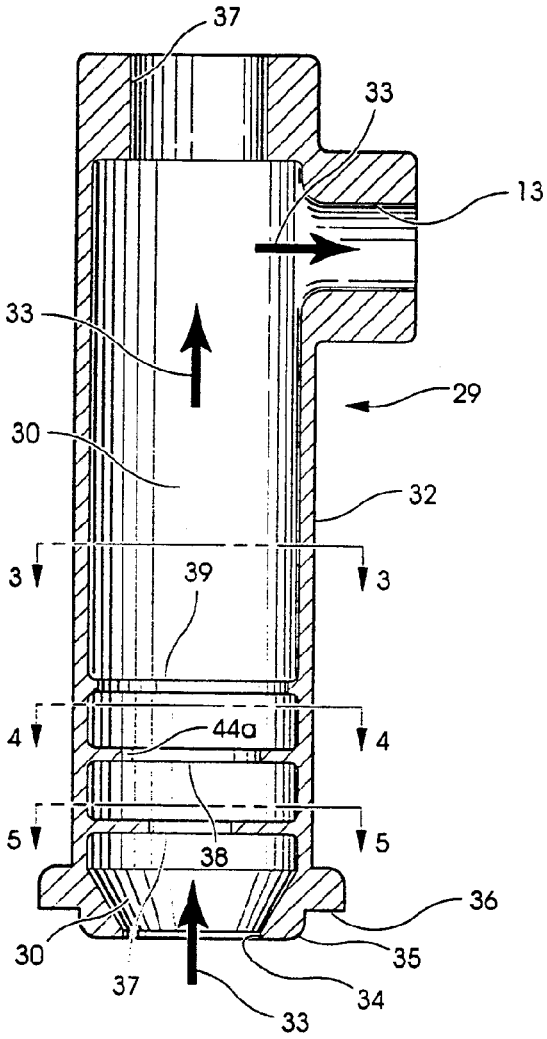
FIG. 2 shows a side cross-sectional view of a housing defining an improved mixing chamber for the valve assembly shown in FIG. 1.

The mixing dome 29 is shown in more detail in FIG. 2. The housing 32 defines the mixing chamber 30 therein and a flow path 33 therethrough. The housing 32 is provided with a mating surface 35 and an annular flange 36 that enable the housing to be mated to flow control valve 14 by conventional means. Housing 32 also defines an opening 37 at its top which permits an adjustment means, such as screw 27 and shaft 28, to be connected to the thermostat, as better shown in FIG. 1. In operation, the fluid leaving flow control valve 14 enters housing 32 through inlet 34. Immediately afterwards, the fluid encounters baffles 37, 38 and 39 in successive order. The fluid mixture then continues upward along flow path 33 until finally exiting housing 32 through outlet 13.

The outlet 13 is positioned at the end of the mixing chamber or fluid flow path to ensure that the thermostat 26 is substantially immersed in the fluid exiting the valve assembly 10. Moreover, the thermostat 26 is disposed downstream of the sequential baffles, preferably by a distance greater than the distance between successive baffles. Thus, the hot and cold fluids are substantially mixed prior to the thermostat, and substantially all of the thermostat is exposed to the fluid mixture to assure that the thermostat receives a proper indication of the temperature of the exiting fluid.

Figure 3:
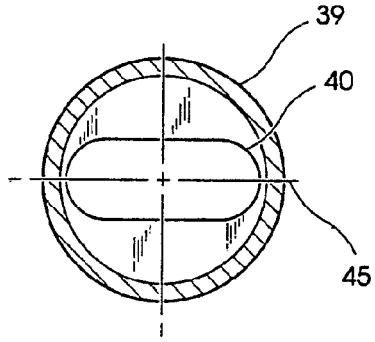
FIG. 3 is a top view along section A-A of FIG. 2 showing a first baffle according to the present invention.
Figure 4:
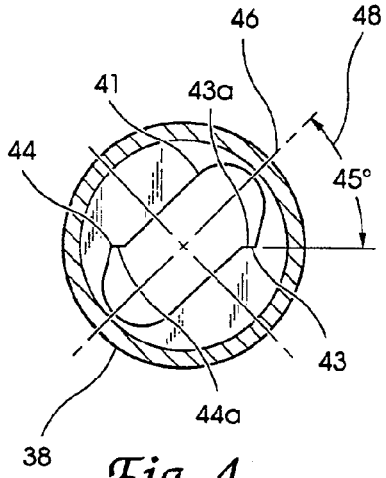
FIG. 4 is a top view along section B-B of FIG. 2 showing a second baffle according to the present invention.
Figure 5:
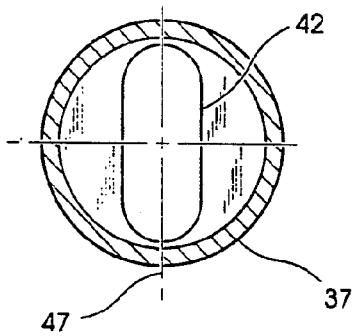
FIG. 5 is a top view along section C-C of FIG. 2 showing a third baffle according to the present invention.

A more detailed view of each baffle is provided in the sectioned views of FIGS. 3, 4 and 5. Each baffle is disc shaped and defines an elongated or oblong opening 40, 41 and 42 respectively therethrough. Oblong openings 40, 41 and 42 are substantially similar in shape and size, except for the two notches 43 and 44 integral with opening 41 in baffle 38. The two notches 43 and 44 are situated on opposite ends and sides of the opening 41, as shown in FIG. 4, and each includes a respective face 43a and 44a that is aligned with the major axis of symmetry (45 in FIG. 3) of the third baffle 39. Notches 43 and 44 facilitate manufacture of the housing 32 and baffles by conventional casting techniques, such as sand casting.

Each respective oblong opening 40, 41 and 42 also defines a corresponding major axis of symmetry 45, 46 and 47 which is useful in illustrating the helical arrangement of baffles 37, 38 and 39 in flow path 33. In this embodiment, each successive major axis of symmetry is rotated through an angle 48, which in this case is 45 degrees, to produce a generally helical flow path through the baffles. Each baffle alone tends to create some turbulence in a fluid passing therethrough due to the fluid restriction through the baffle opening. However, the helical pattern of successive baffles creates an overall amount of mixing which is greater than the sum of the individual baffles acting alone.

The size of the openings must be sufficiently large as to not significantly impede fluid flow through the openings, but sufficiently small to induce adequate mixing of the hot and cold fluid passing through the mixing chamber.

In one specific embodiment of the invention, the housing 32 is of sand-cast bronze and defines a cylindrical mixing chamber 2.0 inches in diameter and about 10.0 inches in length from the base of the mixing chamber to the center of the outlet opening 13. Each of the openings 40-42 in the baffles 37-39, respectively, are oblong with a length of 1.8 inches and a width of 1.0 inches. The baffles are spaced about 1 inch apart. The valve assembly 10 of the specific embodiment is capable of accurately controlling the outlet fluid temperature at flows of 2-80 g.p.m. The fluid mixing provided by the baffles is particularly important at the low flow rates since the fluid flow can "short-circuit" the thermostat in which the entire thermostat is not immersed in the fluid flow prior to the outlet 13.

Figure 6:
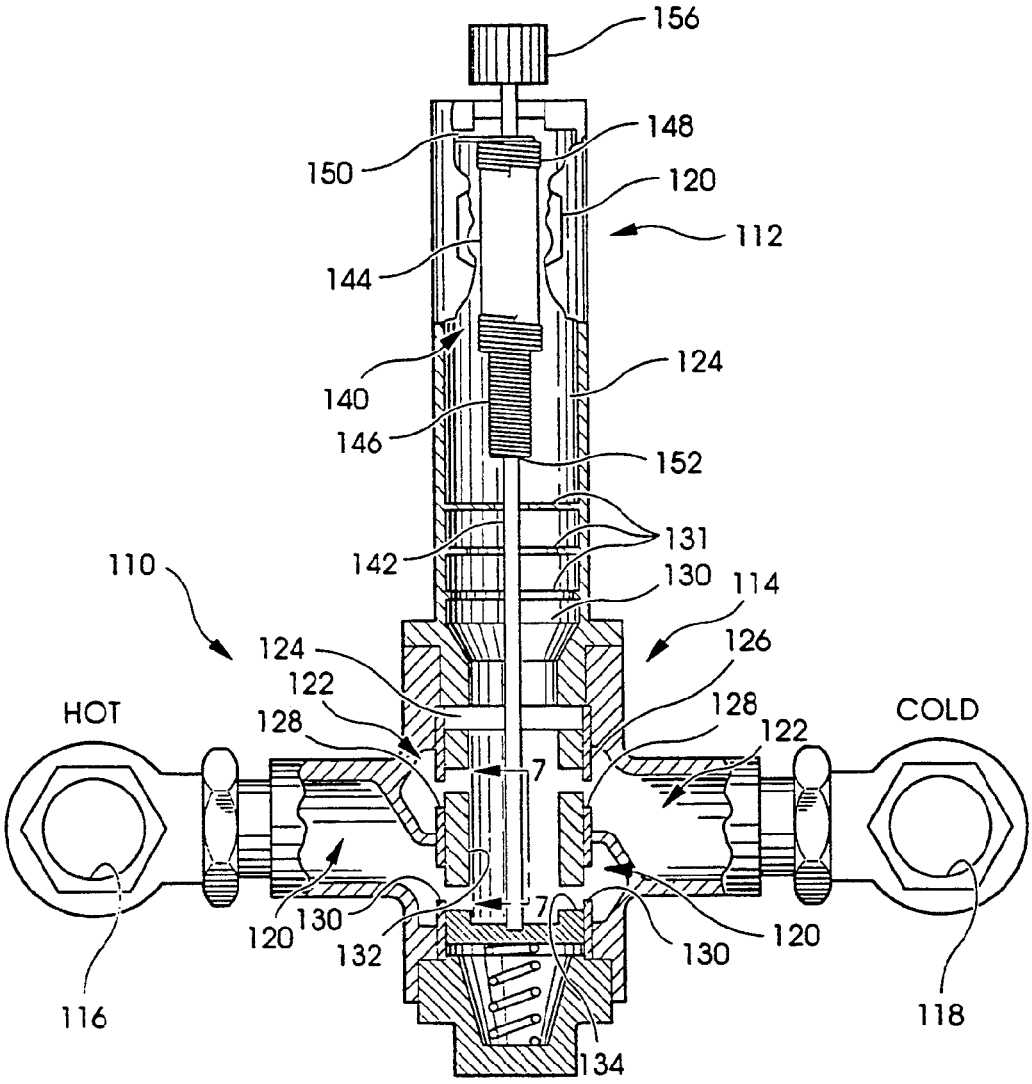
FIG. 6 shows a side cross-sectional view of a thermostatic control valve assembly according to a second embodiment of the present invention.

Referring now to FIG. 6, there is shown a thermostatic control valve assembly 110 according to another embodiment of the present invention. Similar to control valve assembly 10, valve assembly 110 includes generally a housing comprising a mixing dome 112 and a flow control valve 114. Control valve 114 includes a hot inlet 116, a cold inlet 118 and an outlet 120. Inlets 116 and 118 are connected to opposite sides of flow control valve 114 and open to annular cavities 120 and 122, respectively, within the flow control valve. A cylindrical bore 124 extends longitudinally through the mixing dome and control valve and is in fluid communication with the outlet 120.

Within the flow control valve 114, the inner wall of annular cavities 120 and 122 is a continuation of cylindrical bore 124 defined specifically by a cylindrically shaped liner 126. Similar to liner 17 of valve assembly 10, liner 126 is open at both ends and includes a plurality of orifices 128 and 130 which are distributed around its circumference in communication with annular cavities 120 and 122. However, unlike liner 17, orifices 128 and 130 are not necessarily rectangular or other like slots but, instead, are of generally geometric shapes which provide a valve having non-linear response characteristics hereinafter described in conjunction with FIGS. 7-8.

A cylindrically shaped piston 132 is disposed generally within cylindrical bore 124 and, in particular, is slideably mounted within liner 126. Modulation of the piston 132 within the liner 126 results in the piston covering one of the fluid passageways 128 or 130 and uncovering the other respective fluid passageway, thereby variably combining hot and cold fluid for supply within the piston and cylindrical bore 124 and to the outlet 120 of the valve assembly. Preferably, piston 132 is pressure balanced and includes orifices 134 that are distributed around its circumference.

A multiple response thermostat 140 is connected to piston 132 via a push rod 141. Unlike the linear thermostat 26 of valve assembly 10, thermostat 140 is segmented to provide multiple response rates tailored to the desired operational characteristics of the thermostatic control valve.

Generally, thermostat 140 includes a first thermostat portion 142 connected in series with a second thermostat portion 143. Thermostat portion 143 has a faster response but smaller travel than portion 142 to provide immediate, accurate control nearest the discharge of flow control valve 114, where at low flows the hot and cold fluids may not be fully mixed. Conversely, thermostat portion 142 has a slower response but greater travel than portion 143 to provide subsequent control way from the discharge of flow control valve 114, where the hot and cold fluids are more fully mixed.

Thermostat 140 is a variation of the thermal coil variety wherein the thermostat is designed to expand or contract along the axis defined by push rod 141 in response to a change in the temperature of the fluid surrounding the thermostat. Similar to control valve assembly 10, control valve assembly 110 includes a spring 123 to assist in oppositely biasing piston 132. Also contemplated, however, are other segmented thermostats. For example, a temperature sensitive bellows type thermostat which includes varying spring rate bellows for tailoring the response of the bellows type thermostat to the thermostatic control valve can be substituted for thermostat 140.

In operation, with thermostat 140 properly adjusted via adjustment screw 156, thermostat portion 143 is immediately responsive to small changes in fluid temperature adjacent to control valve 114 and accurately adjusts piston 132 relative to orifices 128 and 130 of liner 126. As such, thermostat 140 initially responds as a smaller thermostat to provide an immediate small degree of travel of piston 132 in response to small fluid temperature variations. Subsequently, thermostat portion 142 senses the fully mixed fluid downstream from control valve 114 and provides greater travel of piston 132 in response to large temperature variations in order to achieve the desired discharge fluid temperature.

Figure 6A:
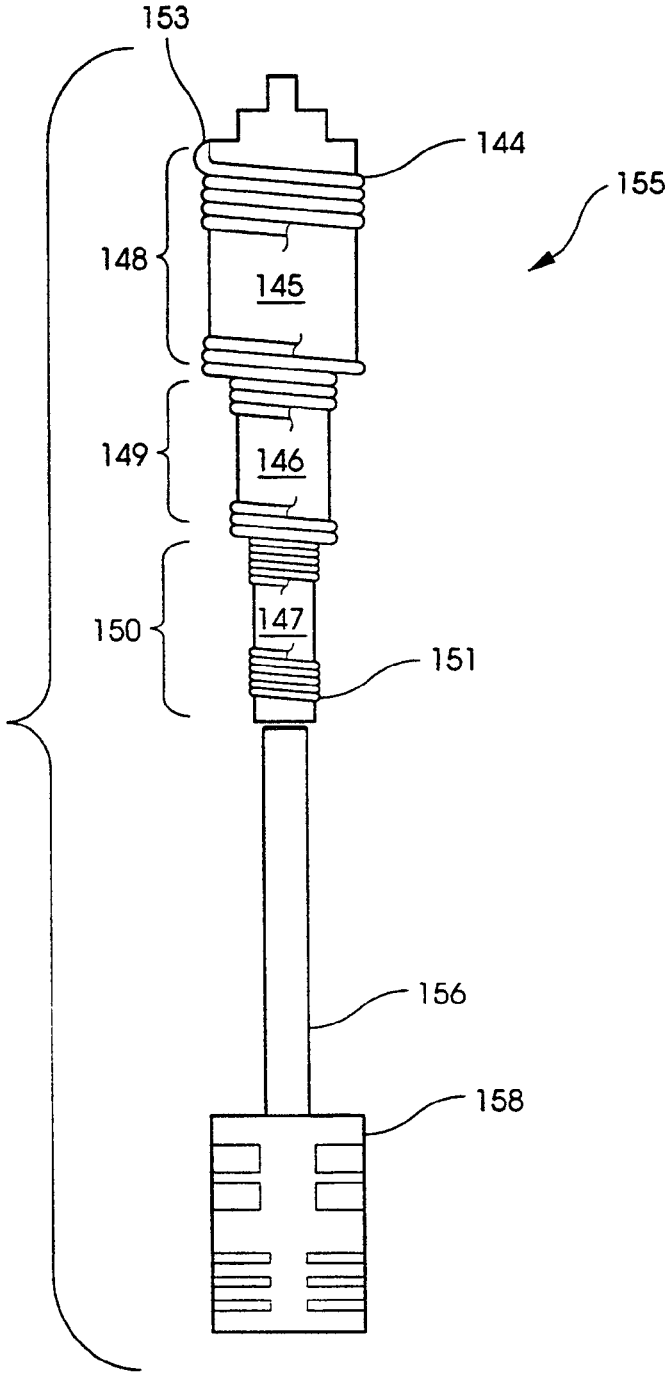
FIG. 6a shows a side elevational view of an alternate thermostat for use with the control valve assembly of FIG. 6.

Referring now to FIG. 6a, in an alternate embodiment, thermostat 155 includes coiled tubing 144 wrapped about first, second and third hollow cylindrical portions 145, 146 and 147 corresponding to first, second and third thermostat portions 148, 149 and 150, respectively. The hollow cylindrical portions together define a longitudinal bore for slideably receiving connecting rod 156 therein. Coiled tubing 144 is filled with a temperature sensitive fluid and is sealed at one end 151 and is fluidly coupled at its other end 153 with an internal control piston (not shown) contained within the hollow bore of cylindrical portion 145 of first thermostat portion 148. The temperature sensitive fluid expands with heat addition to advance the internal control piston which in turn acts on connecting rod 156 to advance piston 158.

Cylindrical sections 145, 146 and 147 are of differing diameters and differing lengths to provide a response rate tailored to the desired mixing valve operational characteristics. For example, a cylindrical portion with an increased diameter and length has more wraps of tubing 144 and, therefore, an increased volume of temperature sensitive fluid to provide greater travel, but slower response for a given fluid temperature in bore 124. Conversely by reducing the diameter and length, fewer wraps of tubing 144 are required and the volume of temperature sensitive fluid is reduced to provide faster response, but smaller travel. The response rates of the various thermostat portions can be further tailored by varying the cross-sectional diameter of tubing 144. For example, the cross-sectional diameter of tubing 144 wrapped about the third thermostat portion 150 is reduced over that wrapped about the first and second thermostat portions 148 and 149 to further reduce the volume of temperature sensitive fluid and provide an even faster response.

To further mix the fluid exiting control valve 114, mixing dome 112 includes baffles 131 similar to baffles 31 of valve assembly 10. However, baffles 131 may not be required in some applications where an even faster response time is desired. In such an application, thermostat 140 is contemplated as having a fast response portion 146 directly adjacent to control valve 114 to provide a near-zero time lag for responding to changes in fluid temperature.

Figure 7C:
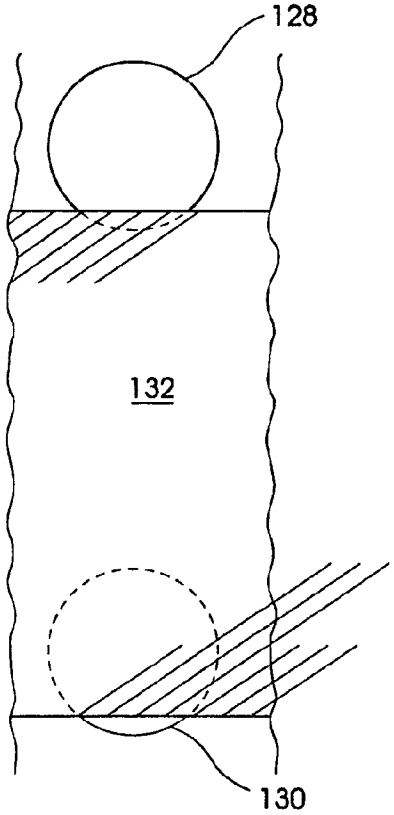
FIG. 7c is a partial side cross-sectional view of the piston in FIG. 7a in a non-linear position uncovering a majority of the cold circular passageway and covering a majority of the hot circular fluid passageway.
Figure 7B:
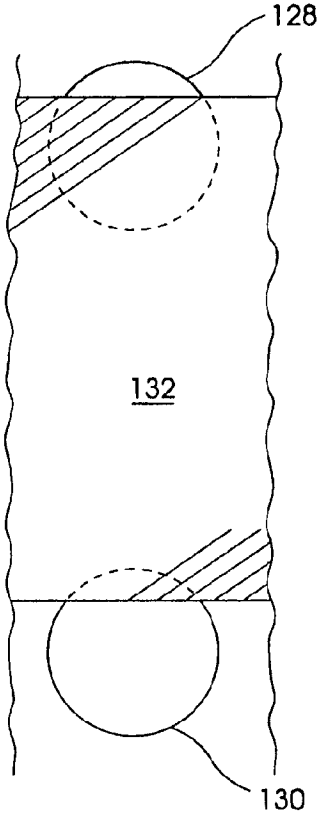
FIG. 7b is a partial side cross-sectional view of the piston in FIG. 7a in a non-linear position covering a majority of the cold circular passageway and uncovering a majority of the hot circular fluid passageway.
Figure 7A:
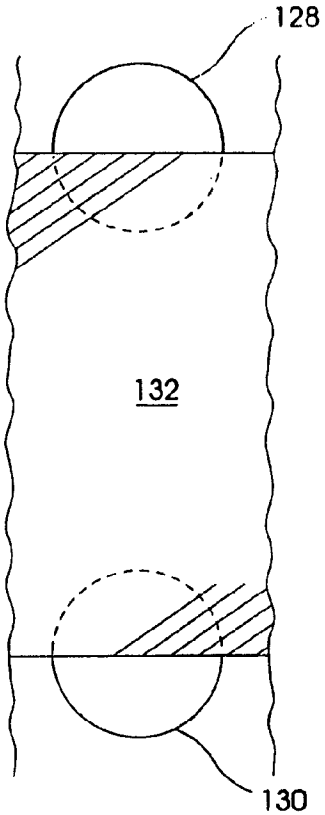
FIG. 7a is a partial side cross-sectional view taken along line 7-7 in the direction of the arrows indicated in FIG. 6 of a piston in a nominal position equally covering hot and cold circular fluid passageways.

Referring now to FIGS. 7a-7c, orifices 128 and 130 are shown in greater detail and at various axial positions of piston 132. In the preferred embodiment, orifices 128 and 130 are circular to provide a non-linear response throughout the range of motion for piston 132. As shown in in FIG. 7a, piston 132 is in a nominal position in which it covers and uncovers equal portions of circular orifices 128 and 130. As such, the fluid flow rate through the uncovered semi-circular portion of orifice 128 is equal to the fluid flow rate through the uncovered semi-circular portion of orifice 130, thus yielding a nominal mixed fluid temperature. In FIG. 7b, piston 132 is shown in a position which covers a majority of circular orifice 128 and uncovers a majority of circular orifice 130, thus yielding a change in fluid flow rate through orifices 128 and 130 to cause a mixed fluid temperature warmer than the nominal fluid temperature. Because the shape of the covered and uncovered portions are generally arcuate or circular, the fluid flow rate through orifice 128 further varies non-linearly with piston position as does the fluid flow rate through orifice 130. As such, the mixed fluid temperature varies non-linearly warmer than nominal with movement of piston 132. Conversely, with piston 132 in the position shown in FIG. 7c uncovering a majority of orifice 128 and covering a majority of orifice 130, the mixed fluid temperature varies non-linearly cooler than nominal with movement of piston 132.

Both orifices 128 and 130 need not be circular to achieve similar non-linear operational characteristics. For example, a circular orifice 128 and a rectangular slot 130 would still result in a non-linear change in fluid flow rate between the uncovered portions of orifices 128 and 130 as piston 132 moves relative thereto.

Figure 8C:
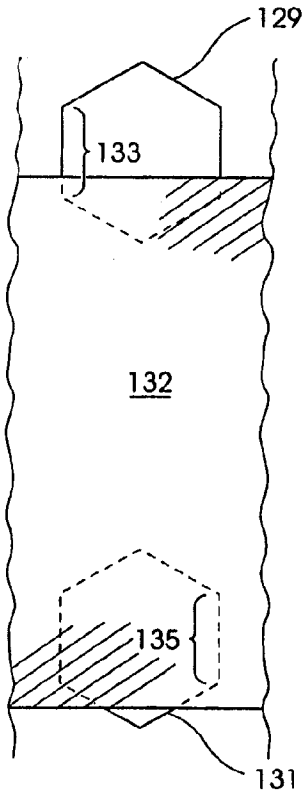
FIG. 8c is a partial side cross-sectional view of the piston in FIG. 8a in a non-linear position uncovering a majority of the cold hexagonal fluid passageway and covering a majority of the hot hexagonal fluid passageway.
Figure 8B:
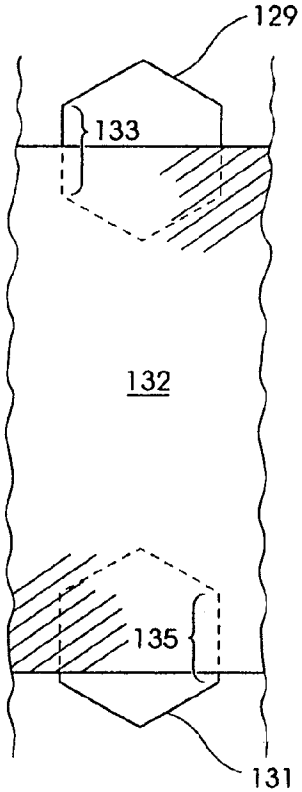
FIG. 8b is a partial side cross-sectional view of the piston in FIG. 8a in a linear position uncovering a majority of the cold hexagonal fluid passageway and covering a majority of the hot hexagonal fluid passageway.
Figure 8A:
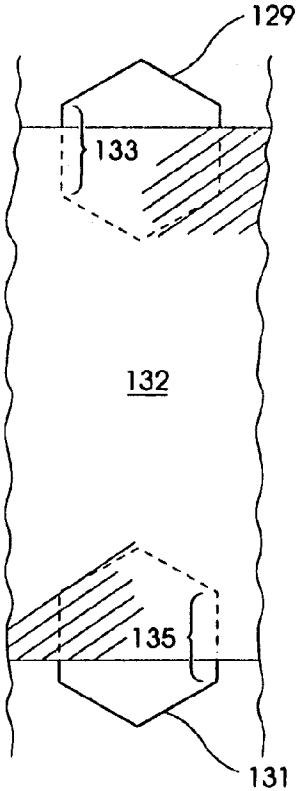
FIG. 8a is a partial side cross-sectional view taken along line 7-7 in the direction of the arrows indicated in FIG. 6 of an alternate embodiment in which the piston is shown in a nominal position equally covering hot and cold hexagonal fluid passageways.

Other non-linear operational characteristics are contemplated as well. Referring now to FIGS. 8a-8c, hexagonal orifices 129 and 131 are shown partially covered by piston 132. By including orifices which are partially rectangular in shape, a partially linear valve response is created when piston 132 is at a first portion of its travel within the rectangular regions generally indicated at mid-portions 133 and 135 of hexagonal orifices 129 and 131, respectively. Between the positions of piston 132 indicated at FIGS. 8a and 8b, the valve response remains linear since the uncovered flow areas and corresponding flow rates through orifices 129 and 131 vary linearly as the piston moves relative thereto. Conversely, as shown in in FIG. 8c, with further movement of piston 132 the valve response becomes non-linear since the uncovered flow areas and flow rates change non-linearly with piston movement; i.e., piston 132 moving to a position beyond one of rectangular mid-portions 133 and 135. Similar to orifices 128 and 130, orifices 129 and 131 need not each be hexagonally shaped. For example, orifice 129 can be hexagonally shaped and orifice 131 can be rectangular while still yielding both linear and non-linear operational characteristics.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

For instance, in the preferred embodiment, the baffles 37, 38 and 39 are integrally formed in the housing 32 by known casting techniques. The invention further contemplates that each baffle is itself a separate disc that is suitably mounted within a cylindrical cavity in the housing. For instance, the separate baffle discs could be held in position using snap rings engaged within snap ring grooves formed in the housing.

Moreover, the invention contemplates incorporating additional baffles sequentially disposed along the flow path. The elongated openings in the baffles, including the additional baffles, preferably have their respective axes of symmetry arranged in the helical pattern described above. Thus, while the oblong openings 40-42 of the preferred embodiment are rotated 45° relative to each other, the addition of more baffles permit smaller relative angular displacements between consecutive baffles.

Further, other means for varying the fluid flow rate non-linearly between the hot and cold fluid passageways as the piston moves in the cylindrical bore are contemplated. For example, piston 132 and liner 126 of bore 124 may cooperate so that movement of piston 132 within liner 126 covers and uncovers passageways within the piston; i.e., piston 132 includes Circular or hexagonal holes. Thus, means for varying the fluid flow rate non-linearly is provided as long as a piston traverses within a cylinder to cause fluid orifices to be covered and uncovered such that the fluid flow rate through one of the orifices varies non-linearly with respect to piston movement, thereby yielding a more sensitive mixing valve.

What is claimed is:

1. A thermostatic control valve assembly for mixing a hot fluid and a cold fluid for discharge at a controlled temperature, the valve assembly comprising:

a valve housing having a fluid outlet and separate hot and cold fluid inlets;

said valve housing including a mixing chamber in fluid communication with said outlet;

flow control valve means, fluidly coupled with said hot and cold fluid inlets and said mixing chamber, for controllably mixing hot and cold fluid received through said hot fluid inlet and said cold fluid inlet, respectively, and supplying the mixed fluid to said mixing chamber; and a multiple response thermostat disposed within said mixing chamber between said outlet and said flow control valve means, said multiple response thermostat including a first thermostat portion having a first response rate and a second thermostat portion having a second faster response rate, said first thermostat portion being connected in series with said second thermostat portion and said second thermostat portion being operably connected to said flow control valve means.

2. The thermostatic control valve assembly of claim 1, wherein said multiple response thermostat includes a thermal coil containing first and second volumes of temperature sensitive fluid corresponding to said first and second response rates, respectively.

3. The thermostatic control valve assembly of claim 2, wherein:

said first thermostat portion includes a first cylinder having a first external diameter;

said second thermostat portion includes a second cylinder attached to said first cylinder and having a second smaller external diameter; and said thermal coil is wrapped about said first and second cylinders.

4. The thermostatic control valve assembly of claim 3, wherein said thermal coil includes a first cross-sectional diameter corresponding to said first response rate of said first thermostat portion and a second smaller cross-sectional diameter corresponding to said second response rate of said second thermostat portion.

5. The thermostatic control valve assembly of claim 1, and further comprising means for turning the fluid flow through said mixing chamber, said means for turning including a plurality of baffles sequentially arranged in said mixing chamber between said flow control valve means and said multiple response thermostat.

6. A valve assembly for mixing a hot fluid and a cold fluid for discharge at a controlled temperature, the valve assembly comprising:

a valve housing having a fluid outlet and separate hot and cold fluid inlets;

a cylinder extending longitudinally through said valve housing and defining a cylindrical bore in fluid communication with said outlet;

a piton movably disposed in said cylindrical bore;

a first fluid passageway fluidly coupling said hot fluid inlet to said cylindrical bore;

a first fluid orifice disposed in either said piston or said cylinder between said first fluid passageway and said cylindrical bore;

a second fluid passageway fluidly coupling said cold fluid inlet to said cylindrical bore; and a second orifice disposed in either said piston or said cylinder between said second fluid passageway and said cylindrical bore;

wherein one of said first or second fluid orifices has a shape such that the fluid flow rate through said one of said first or second fluid orifices varies linearly with respect to the fluid flow rate through the other of said first or second fluid orifices as said piston moves through a first piston of its travel in said cylindrical bore and varies non-linearly with respect to the fluid flow rate through the other of said first or second fluid orifices as said piston moves through a second portion of its travel in said cylindrical bore.

7. The valve assembly of claim 6, wherein said shape is hexagonal.

8. The valve assembly of claim 6, and further comprising means for turning the fluid flow through said cylindrical bore, said means for turning including a plurality of baffles sequentially arranged in said cylindrical bore.

9. A thermostatic control valve assembly for mixing a hot fluid and a cold fluid for discharge at a controlled temperature, the valve assembly comprising:

a valve housing having a fluid outlet and separate hot and cold fluid inlets;

a cylinder extending longitudinally through said valve housing and defining a cylindrical bore in fluid communication with said outlet;

a piston movably disposed in said cylindrical bore;

a multiple response thermostat disposed within said cylindrical bore, said multiple response thermostat including a first thermostat portion having a first response rate and a second thermostat portion having a second faster response rate, said first thermostat portion being connected in series with said second thermostat portion and said second thermostat portion being operably connected to said piston;

a first fluid passageway fluidly coupling said hot fluid inlet to said cylindrical bore;

a first fluid orifice disposed in either said piston or said cylinder between said first fluid passageway and said cylindrical bore;

a second fluid passageway fluidly coupling said cold fluid inlet to said cylindrical bore; and a second fluid orifice disposed in either said piston or said cylinder between said second fluid passageway and said cylindrical bore;

wherein one of said first or second fluid orifices has a shape such that the fluid flow rate through said one of said first or second fluid orifices varies non-linearly with respect to the fluid flow rate through the other of said first or second fluid orifices as said piston moves in said cylindrical bore, thereby causing a corresponding non-linear change in the mixed fluid temperature in said cylindrical bore.

10. The thermostatic control valve assembly of claim 9, wherein said multiple response thermostat includes a thermal coil containing first and second volumes of temperature sensitive fluid corresponding to said first and second response rates, respectively.

11. The thermostatic control valve assembly of claim 10, wherein:

said first thermostat portion includes a first cylinder having a first external diameter;

said second thermostat portion includes a second cylinder attached to said first cylinder and having a second smaller external diameter; and said thermal coil is wrapped about said first and second cylinders.

12. The thermostatic control valve assembly of claim 11, wherein said thermal coil includes a first cross-sectional diameter corresponding to said first response rate of said first thermostat portion and a second smaller cross-sectional diameter corresponding to said second response rate of said second thermostat portion.

13. The thermostatic control valve assembly of claim 9, wherein said shape is circular.

14. The valve assembly of claim 9, wherein one of said first or second fluid orifices has a shape such that the fluid flow rate through said one of said first or second fluid orifices varies linearly with respect to the fluid flow rate through the other of said first or second fluid orifices as said piston moves through a first portion of its travel in said cylindrical bore and varies non-linearly with respect to the fluid flow rate through the other of said first or second fluid orifices as said piston moves through a second portion of its travel in said cylindrical bore.

15. The valve assembly of claim 14, wherein said shape is hexagonal.

16. The valve assembly of claim 9, and further comprising means for turning the fluid flow through said cylindrical bore, said means for turning including a plurality of baffles sequentially arranged in said cylindrical bore between said piston and said multiple response thermostat.

* * * * *